(12) United States Patent
D'Angelo

(10) Patent No.: US 6,364,125 B1
(45) Date of Patent: Apr. 2, 2002

(54) ORGANIZER AND STORAGE CONTAINER

(76) Inventor: Kristen Marie D'Angelo, 27 Floramar, Rancho Santa Margarita, CA (US) 92688

( * ) Notice: Subject to any disclaimer, the term of this patent is extended or adjusted under 35 U.S.C. 154(b) by 0 days.

(21) Appl. No.: 09/705,384

(22) Filed: Nov. 4, 2000

(51) Int. Cl.$^7$ .................................................. A47F 5/00
(52) U.S. Cl. ...................... 211/10; 211/59.2; 211/163; 211/131.1
(58) Field of Search ............................. 211/10, 163, 70, 211/131.1, 59.2; D19/85

(56) References Cited

U.S. PATENT DOCUMENTS

| | | | | |
|---|---|---|---|---|
| 1,887,648 A | * | 11/1932 | Krueger | |
| 2,614,698 A | * | 10/1952 | Bell | |
| 4,549,664 A | * | 10/1985 | Gowan et al. | |
| 4,621,737 A | * | 11/1986 | Casey | 211/70.5 |
| 4,953,696 A | * | 9/1990 | Huang et al. | 211/70 |
| 5,655,671 A | * | 8/1997 | Barry et al. | 211/70 |
| 6,182,842 B1 | * | 2/2001 | Dowling | 211/10 X |
| 6,189,711 B1 | * | 2/2001 | Chang | 211/163 |

* cited by examiner

Primary Examiner—Robert W. Gibson, Jr.
(74) Attorney, Agent, or Firm—Rob Phillips

(57) ABSTRACT

The present invention relates to a device capable of organizing and storing a variety of items. The present invention comprises a base, a primary tubular member, one or more hollow tubular storage members, one or more hollow tubular delivery members and one or more collection compartments. The present invention is designed to rotate allowing the user to quickly and efficiently locate the desired items. In theory the present invention is capable of organizing and storing an infinite number of items. However, in its preferred embodiment the present invention is ideal for organizing and storing small and medium sized items such as LEGO® building blocks.

6 Claims, 3 Drawing Sheets

ORGANIZER AND STORAGE CONTAINER

FIELD OF THE INVENTION

The present invention relates to a device capable of organizing and storing a variety of items. The present invention is designed to rotate allowing the user to quickly and efficiently locate the desired organized and stored items. In theory and application the present invention is capable of organizing and storing an infinite number of items. As an example, the organizer and storage container disclosed herein is ideal for use with LEGO® building blocks. LEGO® building blocks come in a variety of shapes, sizes and colors which lends them to organization and storage such as provided by the present invention. Further, the simplicity of the present invention allows children to easily utilize the organizer and storage container for their toys including LEGO® building blocks.

BACKGROUND OF THE INVENTION

As the population of the United States and world continues to increase, so to does the array of merchandise available to please the vast population. Along with the increase in merchandise being collected comes a lack of storage space. Garages, closets, cabinets, drawers and any other available space has been dedicated to storing said merchandise. Unfortunately, the storage arrangement usually consists of placing the specific merchandise into piles, boxes or static compartments as long as it is out of sight. There are unlimited static storage and organizing units available but the present invention is simple, dynamic and novel.

The problem with the pile or box storage method is the difficulty in later locating the items when desired. The present invention is designed to both organize and store items for easy access at a future time. In its preferred embodiment the present invention is best suited for organizing and storing small to medium sized items. By way of example, the present invention is very proficient for organizing and storing LEGO® building blocks. Said building blocks come in various shapes, sizes and colors. However, there are an infinite number of items including nails, screws, game pieces, arts and crafts pieces that can be organized and stored using the present invention.

Other objects, features and advantages of the invention will be readily apparent from the following description of certain preferred embodiments. It is understood that modifications and variations may be effectuated without departing from the spirit and scope of the present invention.

DETAILED DESCRIPTION OF THE PREFERRED EMBODIMENTS

The present invention addresses the aforementioned problems associated with past organization and storage methods. The organizer and storage container 5 disclosed herein accomplishes its function with a simple, dynamic and novel design.

Accordingly, the present invention comprises a base 10, a primary tubular member 20, one or more tubular storage members 30, one or more tubular delivery members 40 and one or more collection compartments 50. In the preferred embodiment the organizer and storage container 5 utilizes a rotating base 10 thereby allowing the user easy access to a specific tubular storage member 30 and a collection compartment 50. Each described tubular storage member 30 and tubular delivery member 40 is hollow causing an item to be organized and stored to pass through the tubular members and ultimately rest in the collection compartment 50.

In the preferred embodiment the tubular storage members 30 are adjoined vertically parallel to the centrally located primary tubular member 10. Much like buildings forming the Chicago skyline the primary tubular member 10 and the tubular storage members 30 stand 90° to the horizontal base 10. Each tubular storage member 30 comprises an upper section 32 and a lower section 34. The upper section 32 of the tubular storage member 30 defines an opening 36 capable of receiving the item to be stored and organized while the lower section 34 of the tubular storage member 30 is joined to the base 10.

The tubular delivery members 40 have an upper section 42 and a lower section 44. The upper section 42 of the tubular delivery member 40 angularly interconnects with the tubular storage member 30 creating a hollow path between the tubular storage member 30, the tubular delivery member 40 and the collection compartment 50. The lower section 44 of the tubular delivery member 40 defines an opening 46 permitting items to pass through into the collection compartment 50. The tubular delivery member 40 forms an angle of approximately 45° with a vertical centerline of the tubular storage member 30 and the base 10. The angular interconnection between the tubular storage member 30 and the tubular delivery member 40 allows an item placed in the opening 36 of the tubular storage member 30 to pass through a length of the tubular storage member 30 into the angularly interconnected tubular delivery member 40 through the opening 46 and ultimately into the collection compartment 50 located between the lower section 44 of the tubular delivery member 40 and the base 10.

The angular interconnection of the tubular delivery member 40 into the tubular storage member 30 is such that the bottom surface 48 of the tubular delivery member 40 intersects the tubular storage member 30 until it attaches to the inside surface 38 of the vertically placed tubular storage member 30 preventing items from passing into the lower section 34 of the tubular storage member 30 but rather re-directs the items into the tubular delivery member 40 and ultimately into the collection compartment 50. Once in the collection compartment 50 the items are easily accessible to a user.

The collection compartment 50 is capable of storing the items as they pass through the tubular delivery member 40. Any number of designs for the collection compartment 50 are possible. However, in the preferred embodiment the collection compartment's 50 shape is similar to a petri-dish with a flat bottom 52 and a continuous surrounding wall 54. The shape and size of the collection compartment 50, as well as each of the components of the organizer and storage container 5, is dependent on the size of the items to be organized and stored.

Further, in the preferred embodiment of the design disclosed herein, the entire organizer and storage container 5 rotates in a fashion akin to that of a "lazy susan." To accomplish the rotation the base 10 is set upon a turntable 12.

Figure 1:
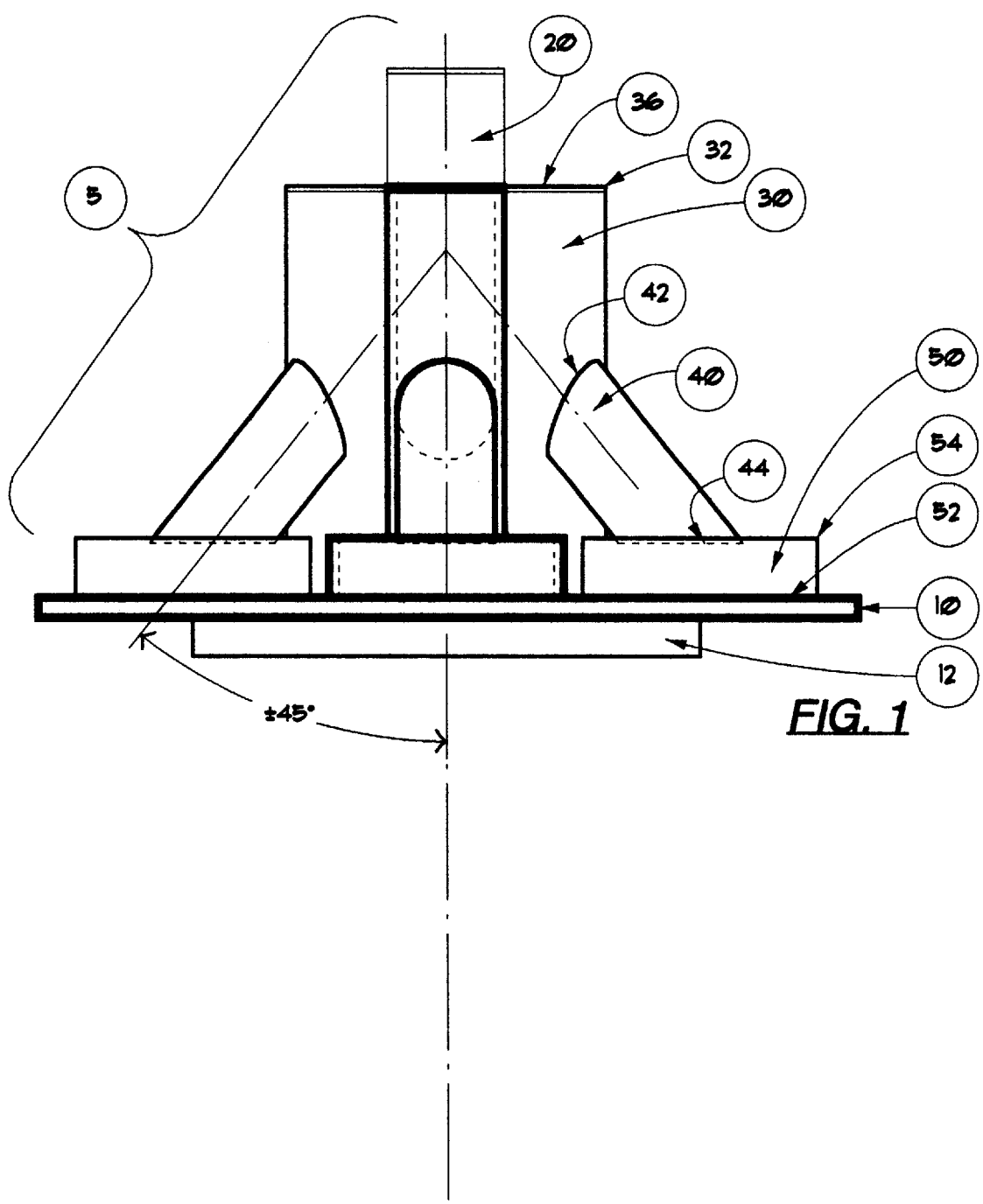
FIG. 1. is a side view of the preferred embodiment of the present invention.
Figure 2:
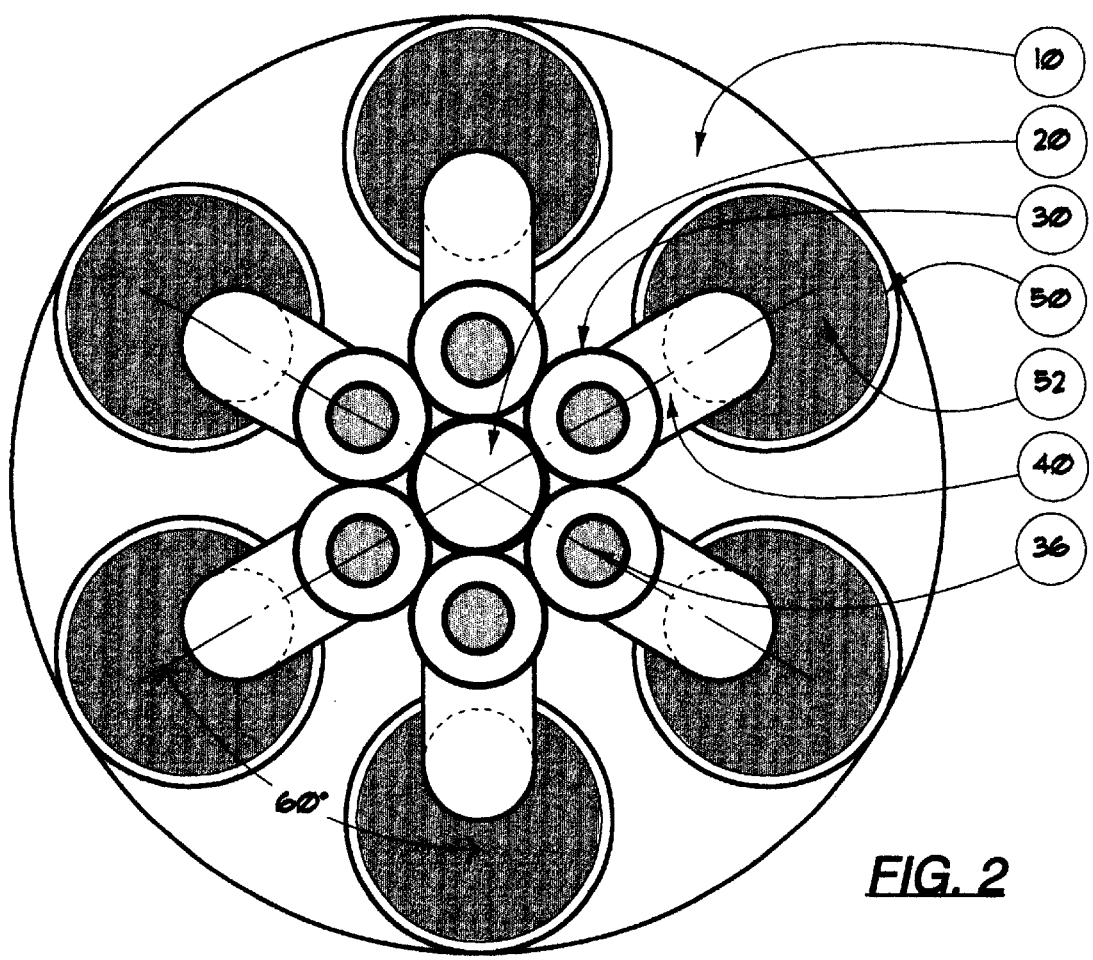
FIG. 2. is a top view of the preferred embodiment of the present invention.
Figure 3:
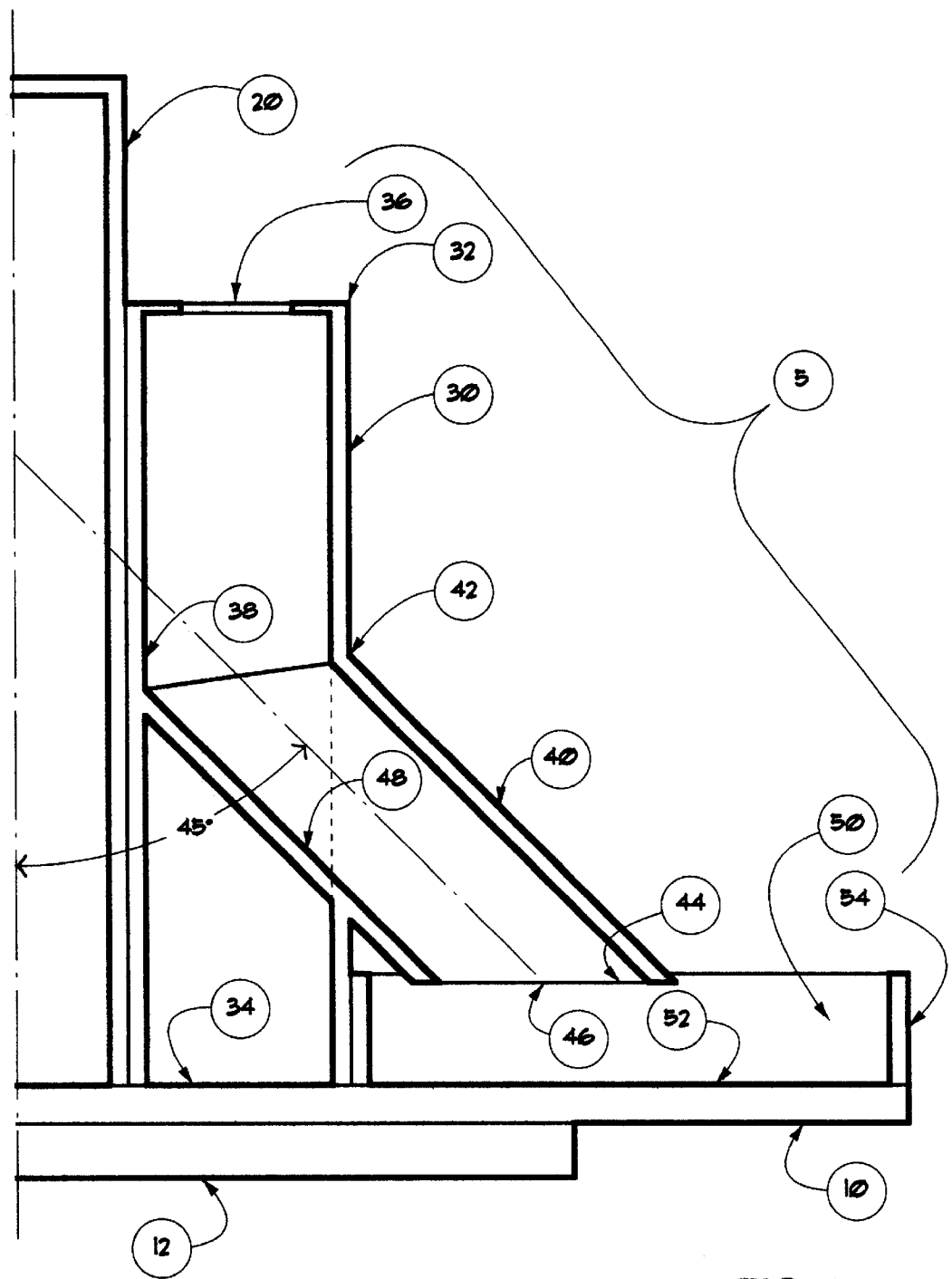
FIG. 3. is a cross-sectional view illustrating the relationship between the tubular storage member, tubular delivery member and the collection compartment.

I claim:

1. An organizer and storage container comprising:
   a base;
   a primary tubular member;
   one or more hollow tubular storage members that adjoin a primary hollow tubular member in a parallel fashion;
   one or more hollow tubular delivery members interconnected to the hollow tubular storage members;
   and one or more collection compartments arranged between the base and a lower section of the tubular delivery member.

2. The organizer and storage container as defined in claim 1 wherein a lower surface of the hollow tubular delivery member intersects the hollow tubular storage member connecting to an inner surface of the hollow tubular storage member.

3. The organizer and storage container as defined in claim 1 wherein the base is rotatable.

4. The organizer and storage container as defined in claim 1 wherein the hollow tubular storage members and the hollow tubular delivery members have a circular cross-section.

5. The organizer and storage container as defined in claim 1 wherein the hollow tubular delivery members form a 45° angle with the base and the hollow tubular storage members.

6. The organizer and storage container as defined in claim 1 wherein the primary tubular member and the hollow tubular storage members are aligned vertically.

* * * * *

UNITED STATES PATENT AND TRADEMARK OFFICE
CERTIFICATE OF CORRECTION

PATENT NO. : 6,364,125 B1
DATED : April 2, 2002
INVENTOR(S) : Kristen Marie D'Angelo It is certified that error appears in the above-identified patent and that said Letters Patent is hereby corrected as shown below:

<u>Column 3,</u>
Line 6, change "a", first occurrence, to -- the --;
Line 11, change "member" to -- member(s) --.

Signed and Sealed this

Third day of September, 2002

Attest:

JAMES E. ROGAN
Attesting Officer *Director of the United States Patent and Trademark Office*